US009551609B2

(12) United States Patent
Smith et al.

(10) Patent No.: US 9,551,609 B2
(45) Date of Patent: Jan. 24, 2017

(54) MODAL ACOUSTIC AIRCRAFT WEIGHT SYSTEM

(71) Applicant: The Boeing Company, Chicago, IL (US)

(72) Inventors: Paul R. Smith, Everett, WA (US); Adam C. Steele, Everett, WA (US); Tristan E. Lee, Seattle, WA (US); Ryan W. Hoffman, Seattle, WA (US); Kyle M. Fanelli, Everett, WA (US)

(73) Assignee: The Boeing Company, Chicago, IL (US)

( * ) Notice: Subject to any disclaimer, the term of this patent is extended or adjusted under 35 U.S.C. 154(b) by 205 days.

(21) Appl. No.: 13/954,698

(22) Filed: Jul. 30, 2013

(65) Prior Publication Data

US 2015/0034395 A1    Feb. 5, 2015

(51) Int. Cl.
    *G01G 19/07*    (2006.01)
    *G01G 19/02*    (2006.01)
    *G01G 3/16*     (2006.01)

(52) U.S. Cl.
    CPC ............... *G01G 19/02* (2013.01); *G01G 3/16* (2013.01); *G01G 19/07* (2013.01)

(58) Field of Classification Search
    CPC ............ G01G 19/07; G01G 3/13; G01G 3/16; G01G 3/18; G01G 19/02; G01L 1/162; G01L 1/165; G01L 1/167
    See application file for complete search history.

(56) References Cited

U.S. PATENT DOCUMENTS

| 2,443,045 | A | * | 6/1948 | Bender, Jr. et al. .......... 73/65.06 |
| 2,453,607 | A | * | 11/1948 | Wardle et al. .............. 73/65.06 |
| 2,806,686 | A | * | 9/1957 | Miller, Jr. .................... 177/146 |
| 3,263,497 | A | * | 8/1966 | Leiber ..................... 73/862.381 |
| 3,273,382 | A | * | 9/1966 | Fonash ......................... 73/767 |

(Continued)

FOREIGN PATENT DOCUMENTS

| EP | 0208777 B1 | 12/1989 |
| EP | 0991927 B1 | 5/2012 |

(Continued)

OTHER PUBLICATIONS

International Search Report and Written Opinion for International Application No. PCT/US/2014/040896, Date of Mailing: Oct. 16, 2014, 17 pages.

*Primary Examiner* — Randy W Gibson

(74) *Attorney, Agent, or Firm* — Toler Law Group, P.C.

(57) ABSTRACT

A method includes receiving characteristic information from a sensor. The characteristic information may be representative of a characteristic of a weight bearing structure of an aircraft when a force is applied to the weight bearing structure. The method includes determining a weight of the aircraft based on the characteristic information. The method includes receiving attitude information from an attitude sensor. The attitude information indicates whether the aircraft is situated on a level surface. The method includes determining a balance condition based on the attitude information and the weight of the aircraft. The balance condition indicates whether the weight of the aircraft is distributed evenly. The method includes generating an alert when the balance condition indicates that the weight of the aircraft is not distributed evenly.

19 Claims, 5 Drawing Sheets

(56) References Cited

U.S. PATENT DOCUMENTS

| | | | |
|---|---|---|---|
| 3,453,870 A | 7/1969 | Pickholtz | |
| 3,473,369 A * | 10/1969 | Garrison | 73/65.06 |
| 3,488,997 A * | 1/1970 | Kliever | 73/65.06 |
| 3,620,074 A * | 11/1971 | Laimins | 73/862.631 |
| 3,701,279 A * | 10/1972 | Harris et al. | 73/65.06 |
| 3,797,302 A * | 3/1974 | Laimins | 177/211 |
| 3,864,755 A * | 2/1975 | Hargis | 360/133 |
| 3,878,477 A * | 4/1975 | Dias et al. | 331/40 |
| 4,050,530 A * | 9/1977 | Storace | 177/1 |
| 4,107,626 A * | 8/1978 | Kiewit | 331/65 |
| 4,312,042 A * | 1/1982 | Bateman | 701/124 |
| 4,573,357 A * | 3/1986 | Meunier | 73/514.28 |
| 4,614,245 A * | 9/1986 | Yamanaka | 177/210 FP |
| 4,623,813 A * | 11/1986 | Naito et al. | 310/313 R |
| 4,782,706 A * | 11/1988 | Kister et al. | 73/779 |
| 4,850,552 A * | 7/1989 | Darden et al. | 244/100 R |
| 4,947,694 A * | 8/1990 | Kirman et al. | 73/862.59 |
| 4,977,784 A * | 12/1990 | Eckerle | 73/862.041 |
| 5,161,628 A * | 11/1992 | Wirth | 177/137 |
| 5,205,514 A * | 4/1993 | Patzig et al. | 244/103 R |
| 5,232,243 A * | 8/1993 | Blackburn et al. | 280/732 |
| 5,239,137 A * | 8/1993 | Patzig | 177/136 |
| 5,521,827 A * | 5/1996 | Lindberg et al. | 701/124 |
| 5,585,571 A * | 12/1996 | Lonsdale et al. | 73/862.325 |
| 5,850,757 A * | 12/1998 | Wierenga | 73/296 |
| 6,137,065 A * | 10/2000 | Zefira | 177/25.13 |
| 6,564,142 B2 * | 5/2003 | Godwin et al. | 701/124 |
| 7,683,274 B2 * | 3/2010 | Dellac et al. | 177/211 |
| 8,398,029 B2 * | 3/2013 | Leroy et al. | 244/137.1 |
| 2006/0266561 A1 * | 11/2006 | Dellac et al. | 177/136 |
| 2013/0327579 A1 * | 12/2013 | Nance | 177/1 |

FOREIGN PATENT DOCUMENTS

| | | |
|---|---|---|
| JP | 2013 083483 A | 5/2013 |
| WO | WO 90 13799 A1 | 11/1990 |
| WO | WO 9607087 A1 | 3/1996 |
| WO | WO 0100454 A1 | 1/2001 |

* cited by examiner

MODAL ACOUSTIC AIRCRAFT WEIGHT SYSTEM

FIELD OF THE DISCLOSURE

The present disclosure is generally related to a weight determination system for determining a weight of a structure.

BACKGROUND

Aircraft manufacturers are required to specify maximum certified take-off weights and aircraft center of gravity measurements. Prior to takeoff of an aircraft, a pilot of the aircraft or another member of the aircraft's crew may estimate a total aircraft weight to ensure that the aircraft is below the maximum certified take-off weight of the aircraft as specified by the aircraft's manufacturer. These estimates are typically performed using standardized passengers weights, which may lead to errors in the accuracy of the estimated weight of the aircraft. The Federal Aviation Administration (FAA) has authorized the use of onboard weight and balance systems (OBWBS) to determine the weight of an aircraft and has outlined the requirements that the OBWBS systems must meet to be certified for use with commercial aircraft. Accordingly, there is a need for an OBWBS system that can be used as a primary method of determining the weight of an aircraft.

SUMMARY

Disclosed herein are embodiments of a weight determination system suitable to be certified as a primary weight determination system. The weight determination system may be used to determine a weight of a structure, such as an aircraft. The weight determination system may include actuators and sensors coupled to weight bearing structures, such as components of a landing gear system of the aircraft. The weight bearing structures may support the total weight of the structure (e.g., the aircraft). The actuators may be configured to apply a force to the weight bearing structures and the sensors may detect a characteristic (e.g., a frequency of resonance) of the weight bearings structures while the force is being applied to the weight bearing structures by the actuators. The sensors may generate sensor data that is representative of the characteristics of the weight bearing structures and may transmit the sensor data to a controller configured to determine a weight of the aircraft based on the sensor data. For example, sensor data associated with a characteristic of a particular weight bearing structure may be used by the controller to determine a weight of at least a portion of the structure (e.g., the aircraft) that is supported by the particular weight bearing structure.

In a particular embodiment, an aircraft includes a weight bearing structure, an actuator coupled to the weight bearing structure, a sensor coupled to the weight bearing structure, a processor communicatively coupled to the sensor, and a memory. The actuator may be configured to apply a force to the weight bearing structure and the sensor may be configured to generate sensor information associated with the force applied to the weight bearing structure by the actuator. The memory may store instructions that, when executed by the processor, cause the processor to receive the sensor information from the sensor and to determine a weight of at least a portion of the aircraft based on the sensor information.

In another embodiment, a method includes receiving characteristic information from a sensor. The characteristic information may be representative of a characteristic of a weight bearing structure of an aircraft when a force is applied to the weight bearing structure. The method includes determining a weight of at least a portion the aircraft based on the characteristic information.

In another embodiment, a computer-readable storage device includes instructions that, when executed by a processor, cause the processor to receive characteristic information from a sensor. The characteristic information may be representative of a characteristic of a weight bearing structure of an aircraft when a force is applied to the weight bearing structure. The computer-readable storage device includes instructions that, when executed by the processor, cause the processor to determine a weight of at least a portion of the aircraft based on the characteristic information.

DETAILED DESCRIPTION

Figure 1:
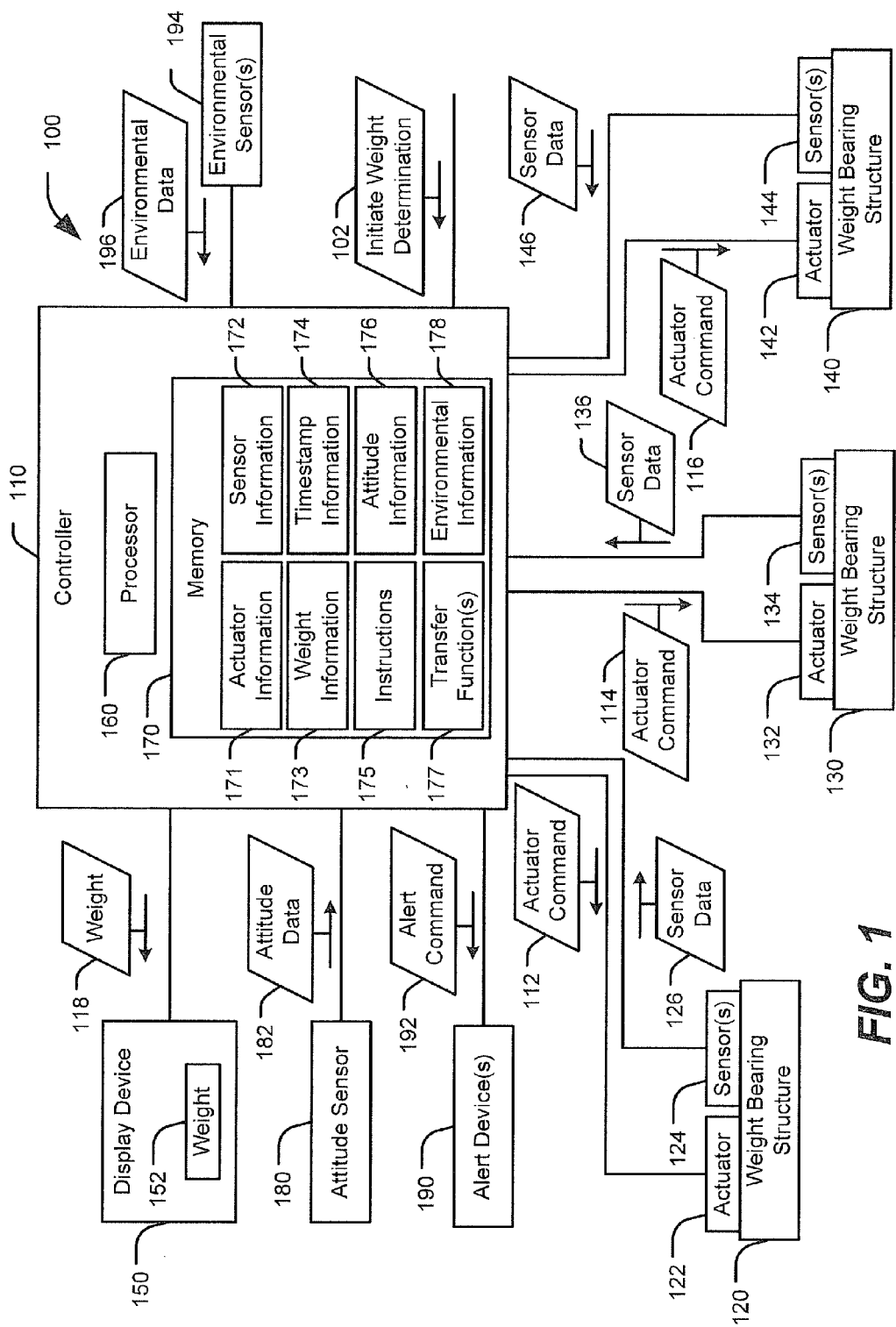
FIG. 1 is a block diagram of an illustrative embodiment of a weight determination system configured to determine a weight of a structure.

Referring to FIG. 1, a block diagram of an illustrative embodiment of a weight determination system 100 configured to determine a weight of a structure is shown. The weight determination system 100 includes a controller 110, actuators 122, 132, 142, and sensors 124, 134, 144. The controller 110 may be communicatively coupled to the actuators 122, 132, 142 and to the sensors 124, 134, 144 via a wired or wireless communication link. The controller 110 includes a processor 160 and a memory 170. The memory 170 may store actuator information 171, sensor information 172, weight information 173, timestamp information 174, instructions 175, attitude information 176, transfer function information 177, or a combination thereof.

As shown in FIG. 1, the actuators 122, 132, 142 and the sensors 124, 134, 144 may be coupled to or positioned proximate to one or more weight bearing structures. For example, in FIG. 1, the actuator 122 and the sensor 124 may be coupled to or positioned proximate to a weight bearing structure 120, the actuator 132 and the sensor 134 may be coupled to or positioned proximate to a weight bearing structure 130, and the actuator 142 and the sensor 144 may be coupled to or positioned proximate to a weight bearing structure 140. In an embodiment, the weight bearing structures 120, 130, 140 may correspond to components of a structure (e.g., an aircraft). For example, each of the weight bearing structures 120, 130, 140 may correspond to components of the structure (e.g., components of a landing gear system of the aircraft), as described with reference to FIGS. 4 and 5.

In an embodiment, the actuators 122, 132, 142 may be acoustic actuators and may be configured to apply an acoustic force to the weight bearing structures 120, 130, 140. In another embodiment, the actuators 122, 132, 142 may be mechanical actuators and may be configured to apply a mechanical force to the weight bearing structures 120, 130, 140. In another embodiment, the actuators 122, 132, 142 may be electromagnetic actuators and may be configured to apply an electromagnetic force to the weight bearing structures 120, 130, 140. In another embodiment, the actuators 122, 132, 142 may be piezoelectric actuators and may be configured to apply a mechanical force to the weight bearing structures 120, 130, 140.

In an embodiment, a type (e.g., mechanical, acoustic, electromagnetic, piezoelectric, etc.) of each of the actuators 122, 132, 142 may be determined based at least in part on the weight bearing structures 120, 130, 140 to which the actuators 122, 132, 142 are coupled. When the weight bearing structures 120, 130, 140 are the same, each of the actuators 122, 132, 142 may be of the same type. For example, each of the actuators 122, 132, 142 may be acoustic actuators. When the weight bearing structures 120, 130, 140 are not the same, the actuators 122, 132, 142 may include two or more different types of actuators. For example, the actuator 122 may be a first type of actuator (e.g., the acoustic actuator) and the actuators 132, 142 may be a second type of actuator (e.g., the mechanical actuator, the electromagnetic actuator, the piezoelectric actuator).

In an embodiment, the type of each of the actuators 122, 132, 142 may be determined based at least in part on a material used to form the weight bearing structures 120, 130, 140. For example, the weight bearing structures 120, 130, 140 may be formed using one or more materials (e.g., titanium, steel, carbon fiber, aluminum, etc.). A first material of the one or more materials and a second material of the one or more materials may respond (i.e., resonate) differently to different types of forces applied by different types of actuators.

For example, a first weight bearing structure formed using the first material and a second weight bearing structure formed using the second material may respond differently to a first force (e.g., an electromagnetic force) applied by a first type of actuator (e.g., an electromagnetic actuator) and to a second force (e.g., an acoustic force) applied by a second type of actuator (e.g., an acoustic actuator). The response of the first weight bearing structure to the first force applied by the first type of actuator may produce characteristic data that may be used by a weight determination system (e.g., the weight determination system 100) to perform a weight determination of at least a portion of a structure supported by the first weight bearing structure. The response of the first weight bearing structure to the second force applied by the second type of actuator may not produce characteristic data that may be used by the weight determination system to perform the weight determination of at least the portion of the structure supported by the first weight bearing structure. The response of the second weight bearing structure to the first force applied by the first type of actuator may not produce characteristic data that may be used by the weight determination system to perform a weight determination of at least a portion of a structure supported by the second weight bearing structure. The response of the second weight bearing structure to the second force applied by the second type of actuator may produce characteristic data that may be used by the weight determination system to perform the weight determination of at least the portion of the structure supported by the second weight bearing structure. Hence, a first type of actuator may be used to apply a force to a first weight bearing structure formed using the first material and a second type of actuator may be used to apply a force to a second weight bearing structure formed using the second material.

In an embodiment, a single weight bearing structure may be formed using more than one material and the type of actuator coupled to the weight bearing structure may be determined based on a location where the actuator is to be coupled to the weight bearing structure. For example, the weight bearing structure may include a first component formed using a first material (e.g., titanium) and a second component formed using a second material (e.g., steel). The type of actuator coupled to the weight bearing structure may be determined based on whether the actuator is to be coupled to the first component formed using the first material or is to be coupled to the second component formed using the second material. Additionally or alternatively, multiple actuators of different actuator types may be coupled to the weight bearing structure. For example, a first actuator of a first actuator type may be coupled to the first component (formed using the first material) of the weight bearing structure, and a second actuator of a second actuator type may be coupled to the second component (formed using the second material) of the weight bearing structure.

In an embodiment, the force applied to the weight bearing structures 120, 130, 140 by the actuators 122, 132, 142 may cause the weight bearing structures 120, 130, 140 to vibrate. The sensors 124, 134, 144 may be configured to detect a characteristic (e.g., a frequency of resonance or an amplitude of the vibrations) of the weight bearing structures 120, 130, 140. In an embodiment, the sensors 124, 134, 144 may be acoustic sensors and may be configured to detect the frequency at which the vibrations of the weight bearing structures 120, 130, 140 resonate. In another embodiment, the sensors 124, 134, 144 may be mechanical sensors and may be configured to detect the frequency at which the vibrations of the weight bearing structures 120, 130, 140 resonate. In another embodiment, the sensors 124, 134, 144 may be transducers and may be configured to detect the frequency at which the vibrations of the weight bearing structures 120, 130, 140 resonate. In another embodiment, the sensors 124, 134, 144 may be piezoelectric sensors and may be configured to detect the frequency at which the vibrations of the weight bearing structures 120, 130, 140 resonate. In other embodiments, the sensors 124, 134, 144 may detect other characteristics of the response of the weight bearing structures 120, 130, 140 to the force applied by the actuators 122, 132, 14, such as an amplitude of the vibrations, vibration damping, etc.

The sensors 124, 134, 144 may be configured to detect a response of the weight bearing structures 120, 130, 140 and to generate sensor data representative of the response of the weight bearing structures 120, 130, 140. For example, the sensor 124 may generate sensor data 126, the sensor 134 may generate sensor data 136, and the sensor 144 may generate sensor data 146. The sensor data 126 may be representative of a response of the weight bearing structure 120 to the force applied to the weight bearing structure 120 by the actuator 122. The sensor data 136 may be representative of a response of the weight bearing structure 130 to the force applied to the weight bearing structure 130 by the actuator 132. The sensor data 146 may be representative of a response of the weight bearing structure 140 to the force applied to the weight bearing structure 140 by the actuator 142.

Figure 2:
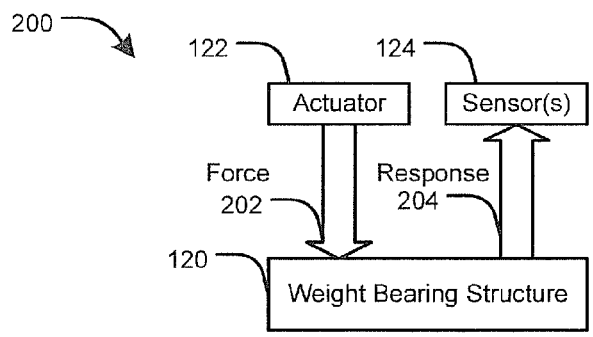
FIG. 2 is an illustrative embodiment of an actuator configured to apply a force to a component of a weight bearing structure and a sensor configured to detect a characteristic of the weight bearing structure during the application of the force.

For example, referring to FIG. 2, an illustrative embodiment of applying a force to a weight bearing structure and detecting a response of the weight bearing structure during the application of the force is shown and designated 200. In FIG. 2, the weight bearing structure 120, the actuator 122, and the sensor 124 of FIG. 1 are shown. As shown in FIG. 2, the actuator 122 may apply a force 202 to the weight bearing structure 120. The force 202 may be a mechanical force, an electromagnetic force, or an acoustic force. The sensor 124 may be configured to detect a response 204 of the weight bearing structure 120 to the application of the force 202 by the actuator 122. The response 204 may be representative of a characteristic of the weight bearing structure 120 when the force 202 is applied to the weight bearing structure 120. In an embodiment, the characteristic may be a frequency of resonance of the weight bearing structure 120. As described with reference to FIG. 1, the weight bearing structure 120 may be coupled to or integrated within a structure (e.g., an aircraft) and weight of at least a portion of the structure may be supported by the weight bearing structure 120. As the weight of at least the portion of the structure (e.g., the aircraft) increases or decreases, the characteristic (e.g., the frequency of resonance) of the weight bearing structure 120 may change.

For example, the structure may be an aircraft and the weight bearing structure 120 may be a component (e.g., a strut, an axle, a truck, etc.) of a landing gear system of the aircraft. The aircraft may have a first weight when the aircraft is empty (i.e., there are no passengers, luggage, etc. on board the aircraft), and the aircraft may have a second weight when the aircraft is at least partially loaded (i.e., there are passengers, luggage, cargo, etc. on board the aircraft). The second weight may be greater than the first weight due to the aircraft being at least partially loaded (i.e., due to the weight of the passengers, the weight of the luggage, etc.). The weight bearing structure 120 may have a first characteristic value when the force is applied to the weight bearing structure 120 when the aircraft is empty and may have a second characteristic value when the force is applied to the weight bearing structure 120 when the aircraft is at least partially loaded.

For example, when the force 202 is applied to the weight bearing structure 120 when the aircraft is empty, the response 204 of the weight bearing structure 120 may correspond to a first frequency of resonance (e.g., the first characteristic value), and, when the force 202 is applied to the weight bearing structure 120 when the aircraft is at least partially loaded, the response 204 of the weight bearing structure 120 may correspond to a second frequency of resonance (e.g., the second characteristic value). In an embodiment, the first frequency of resonance may be greater than the second frequency of resonance. In another embodiment, the second frequency of resonance may be greater than the first frequency of resonance. The sensor 124 may detect the response 204 and generate sensor data (e.g., the sensor data 126 of FIG. 1) that may be representative of the characteristic (e.g., the first characteristic value or the second characteristic value) of the weight bearing structure 120.

In an embodiment, the response 204 of the weight bearing structure 120 may exhibit more than two frequencies of resonance (e.g., more than two distinct characteristic values or frequencies of resonance). In an embodiment, the response 204 (i.e., the characteristic value representative of the frequency of resonance) of the weight bearing structure 120 may be proportionate to a weight of a portion of the aircraft supported by the weight bearing structure 120). For example, the response 204 (e.g., the frequency of resonance or characteristic value) may decrease as the weight of at least the portion of the aircraft supported by the weight bearing structure 120 decreases, and the frequency of resonance may increase as the weight of at least the portion of the aircraft supported by the weight bearing structure 120 increases. In another embodiment, the response 204 (i.e., the characteristic value or the frequency of resonance) of the weight bearing structure 120 may be inversely proportional to the weight of at least the portion of the aircraft supported by the weight bearing structure 120. For example, the response 204 (e.g., the frequency of resonance or characteristic v) may increase as the weight of at least the portion of the aircraft supported by the weight bearing structure 120 decreases and the response 204 may decrease as the weight of at least the portion of the aircraft supported by the weight bearing structure 120 increases.

Referring back to FIG. 1, the sensors 124, 134, 144 may be configured to transmit the sensor data 126, 136, 146 to the controller 110. The controller 110 may be configured to determine a weight of at least a portion of the structure coupled to the weight bearing structures 120, 130, 140. To illustrate, during operation, the controller 110 may transmit actuator commands 112, 114, 116 to the actuators 122, 132, 142. The actuator commands 112, 114, 116 may cause each of the actuators 122, 132, 142 to apply a force to a respective one of the weight bearing structures 120, 130, 140. For example, the actuator 122 may apply a force (e.g., the force 204 of FIG. 2) to the weight bearing structure 120 in response to receiving to the actuator command 112, the actuator 132 may apply a force to the weight bearing structure 130 in response to receiving the actuator command 114, and the actuator 142 may apply a force to the weight bearing structure 140 in response to receiving to the actuator command 116. In an embodiment, the instructions 175 may include instructions that, when executed by the processor 160, cause the processor to generate the actuator commands 112, 114, 116 and to transmit the actuator commands 112, 114, 116 to each of the actuators 122, 132, 142.

The sensors 124, 134, 144 may be configured to detect a characteristic of a respective one of the weight bearing structures 120, 130, 140 during or after the application of force to the weight bearing structure 120, 130, 140 by the actuators 122, 132, 142. For example, the sensor 124 may be configured to detect a characteristic of the weight bearing structure 120, as described with reference to FIG. 2, and to generate the sensor data 126 representative of the characteristic of the weight bearing structure 120, the sensor 134 may be configured to detect a characteristic of the weight bearing structure 130 and to generate the sensor data 136 representative of the characteristic of the weight bearing structure 130, the sensor 144 may be configured to detect a characteristic of the weight bearing structure 140 and to generate the sensor data 146 representative of the characteristic of the weight bearing structure 140.

The sensors 124, 134, 144 may transmit the sensor data 126, 136, 146 to the controller 110, and the controller 110 may be configured to determine the weight of at least a portion of the structure supported by the weight bearing structures 120, 130, 140 based on the sensor data 126, 136, 146. For example, the controller 110 may determine a weight of a first portion of the structure (e.g., the aircraft) based on the sensor data 126 received from the sensor 124. The weight of the first portion of the structure may correspond to a first amount of weight of the structure that is supported by the weight bearing structure 120. The controller 110 may determine a weight of a second portion of the structure based on the sensor data 136 received from the sensor 134. The weight of the second portion of the structure may correspond to a second amount of weight of the structure that is supported by the weight bearing structure 130. The controller 110 may determine a weight of a third portion of the structure based on the sensor data 146 received from the sensor 144. The weight of the third portion of the structure may correspond to a third amount of weight of the structure that is supported by the weight bearing structure 140. Thus, the controller 110 may be configured to add the weight of the first portion of the structure, the weight of the second portion of the structure, and the weight of the third portion of the structure to determine a total weight of the structure (i.e., a total amount of weight supported by the weight bearing structures 120, 130, 140). In an embodiment, the instructions 175 may include instructions that, when executed by the processor 160, cause the processor 160 to receive the sensor data 126, 136, 146, and to determine a weight of at least a portion of the structure based on the sensor data 126, 136, 146.

By determining the weight of the structure (or of portions of the structure) using the weight determination system 100, more accurate real-time weight determinations may be achieved. Additionally, maintenance of the structure may be reduced due to the modular design of the weight determination system 100. For example, when the actuator 122 fails, only the actuator 122 needs to be replaced, rather than the weight bearing component 120. Additionally, the weight determination system 100 may reduce a likelihood of weight determination errors when compared to current weight determination methods that include human estimates performed using pen and paper.

In an embodiment, the memory 170 may include a transfer function 177, and the controller 110 may process the sensor data 126, 136, 146 using the transfer function 177 to determine the weight of the first portion of the structure, the weight of the second portion of the structure, and the weight of the third portion of the structure. In an embodiment, the memory 170 may include multiple transfer functions 177 and the controller 110 may be configured to select a particular transfer function of the multiple transfer functions 177 based on a configuration of the actuators 122, 132, 142 and the sensors 124, 134, 144. For example, a first transfer function of the multiple transfer functions 177 may be used by the controller 110 to determine a weight of at least a first portion of the structure based on sensor data generated based on a force applied to a first weight bearing structure by a first actuator of a first actuator type (e.g., a mechanical actuator) and a response of the first weight bearing structure detected by a sensor of a first sensor type (e.g., transducers). A second transfer function of the multiple transfer functions 177 may be used by the controller 110 to determine a weight of at least a second portion of the structure based on a force applied to a second weight bearing structure by a second actuator of a second actuator type (e.g., a acoustic actuator) and a response of the second weight bearing structure detected by a sensor of a second sensor type (e.g., an acoustic sensor). Thus, in an embodiment, the multiple transfer functions 177 may include instructions that, when executed by the processor 160, cause the processor 160 to calculate a weight of at least a portion of a structure supported by a weight bearing structure based on a detected characteristic of the weight bearing structure, a type of an actuator used to apply a force to the weight bearing structure, and a type of sensor used to detect a response of the weight bearing structure.

In another embodiment, the transfer functions 177 may be a data structure (e.g., a lookup table) that may be used to determine a weight of at least a portion of a structure supported by a weight bearing structure based on a detected characteristic of the weight bearing structure, a type of an actuator used to apply a force to the weight bearing structure, and a type of sensor used to detect a response of the weight bearing structure. The instructions 175 may include instructions that, when executed by the processor 160, cause the processor to calculate the weight of at least the portion of the structure supported by the weight bearing structure using the lookup table.

In an embodiment, the sensors 124, 134, 144 may detect multiple responses of the weight bearing structures 120, 130, 140 over a period of time (e.g., a period of time that the force is applied to the weight bearing structures 120, 130, 140) and the sensor data 126, 136, 146 may include multiple characteristic values (e.g., multiple frequency of resonance values) detected by the sensors 124, 134, 144 over the period of time. For example, the actuator 122 may apply the force (e.g., the force 202 of FIG. 2) to the weight bearing structure 120 for a first period of time (e.g., one (1) minute) and the sensor 124 may detect the response (e.g., the response 204 of FIG. 2) of the weight bearing structure 120 multiple times (e.g., at intervals of fifteen (15) seconds) during the first time period. Thus, the sensor data 126 may include multiple characteristic values (e.g., multiple detected frequencies of resonance) of the weight bearing structure 120. The multiple characteristic values may be representative of the frequency of resonance of the weight bearing structure 120 during each detection period (e.g., one (1) characteristic value for each fifteen (15) second detection interval) within the first period of time. The controller 110 may be configured to determine an average characteristic value (e.g., an average frequency of resonance) of the weight bearing structure 120 during the first period of time and to determine the weight of at least a portion of the structure supported by the weight bearing structure 120 based on the average characteristic value. In an embodiment, the controller 110 may determine average characteristic values for each of the weight bearing structures 120, 130, 140 based on the sensor data 126, 136, 146 and may be configured to determine a weight of a portion of the structures supported by each of the weight bearing structures 120, 130, 140 based on the average characteristic values of each of the weight bearing structures 120, 130, 140. In an embodiment, the instructions 175 may include instructions that, when executed by the processor 160, cause the processor 160 to determine the average characteristic values of the weight bearing structures 120, 130, 140 and to determine the weight of at least the portion of the structure supported by the weight bearing structures 120, 130, 140 based on the average characteristic values.

In an embodiment, the weight determination system 100 may include a display device 150 that is communicatively coupled to the controller 110. The display device 150 may include control logic (not shown in FIG. 1) for receiving and processing data to be displayed at a display 152 (e.g., a liquid crystal display (LCD), a light emitting diode (LED) display, a segment display, etc.) of the display device 150. The controller 110 may be configured to transmit weight data 118 to the display device 150. The weight data 118 may include information representative of the weight of at least the portion of the structure. In response to receiving the weight data 118, the display device 150 may display the weight of at least the portion of the structure (e.g., an aircraft) at the display 152.

In an embodiment, the weight data 118 may indicate a total weight of the structure. The total weight of the structure may be determined based on a sum of portions of the weight of the structure. For example, the total weight of the structure may be determined by calculating a weight of a portion of the structure supported by each of the weight bearing structures 120, 130, 140. A first portion of the total weight may correspond to a weight of a first portion of the structure that is supported by the weight bearing structure 120, a second portion of the total weight may correspond to a weight of a second portion of the structure that is supported by the weight bearing structure 130, and a third portion of the total weight may correspond to a weight of a third portion of the structure that is supported by the weight bearing structure 140. In another embodiment, the weight data 118 may indicate a portion of a weight of the structure that is supported by each of the weight bearing structures 120, 130, 140 individually. For example, the weight data 118 may indicate that a first portion of the weight of the structure is supported by the weight bearing structure 120, that a second portion of the weight of the structure is supported by the weight bearing structure 130, and that a third portion of the weight of the structure is supported by the weight bearing structure 140. In another embodiment, the weight data 118 may indicate both the total weight of the structure and a portion of the total weight of the structure that is supported by each of the weight bearing structures 120, 130, 140 individually.

In an embodiment, the controller 110 may receive an input 102 requesting initiation of a determination of a weight of at least a portion of the structure supported by the weight bearing structures 120, 130, 140. In an embodiment, the input 102 may be generated in response to selection of a particular control on a control panel (e.g., a button on a control panel of an aircraft). In another embodiment, the controller 110 may be coupled to, or integrated with a control panel (e.g., a control panel of an aircraft), and the controller 110 may generate the input 102 in response to detecting a particular configuration of the control panel (e.g., a configuration indicating that at least a portion of a pre-flight checklist procedure has been completed). In another embodiment, the input 102 may be generated automatically in response detecting a particular condition of a structure coupled to or that includes the weight bearing structures 120, 130, 140. For example, the structure may be an aircraft and the weight bearing structures 120, 130, 140 may correspond to components of a landing gear system of the aircraft. The input 102 may be generated automatically in response to detecting that the landing gear system is active (i.e., the aircraft is on the ground) and that the aircraft has been idle for a threshold period of time (e.g., the aircraft is located at a terminal awaiting completion of loading and/or departure procedures).

In an embodiment, the weight determination system 100 may include an attitude sensor 180 configured to generate attitude information and to provide the attitude information to the processor 110 as attitude data 182. The attitude data 182 may indicate whether the structure is situated on a level surface. The controller 110 may be configured to determine a balance condition based on the attitude data 182 and the weight of the structure. The balance condition may indicate whether the weight of the structure (e.g., the weight of the aircraft) is distributed evenly. In an embodiment, the instructions 175 include instructions that, when executed by the processor 160, cause the processor 160 to receive the attitude data 182 and to determine the balance condition based on the attitude data 182 and the weight of the structure.

In an embodiment, the weight determination system 100 may include one or more alert devices 190 (e.g., audible alarms, lights, etc.). The controller 110 may be configured to generate an alert command 192 and to transmit the alert command 192 to the one or more alert devices 190 in response to detecting a particular condition of the structure. For example, when the balance condition indicates that the weight of the structure is not distributed evenly, the controller 110 may transmit the alert command 192 to the one or more alert devices. Additionally or alternatively, the controller 110 may transmit balance condition information associated with the balance condition to the display device 150 for presentation at the display 152. In an embodiment, the instructions 175 include instructions that, when executed by the processor 160, cause the processor 160 to generate the alert command 192, to transmit the alert command 192 to the one or more alert devices 190, and to generate and transmit the balance condition information to the display device 150.

In an embodiment, the weight determination system 100 may include an environmental sensor 194 that is communicatively coupled to the controller 110. The environmental sensor 194 may be configured to generate environmental data 196 descriptive of an environmental condition (e.g., a humidity level, a temperature, a wind speed, a wind direction, etc.). In an embodiment, the environmental sensor 194 may be coupled to one of the weight bearing structures 120, 130, 140. In an embodiment, the memory 170 may include instructions that, when executed by the processor 160, cause the processor 160 to receive the environmental data 196 from the environmental sensor 194 and to determine the weight of at least the portion of the structure based at least in part on the environmental data 196.

The environmental data 196 enable the weight determination system 100 to make more accurate weight determinations. For example, when determining the weight of at least a portion of the structure, the weight determination system 100 may be configured to determine that a portion of the characteristics (e.g., the frequencies of resonance) of the weight bearing structures 120, 130, 140 can be attributed to environmental conditions (e.g., a wind speed and a wind direction) indicated by the environmental data 196. In an embodiment, the weight determination system 100 may be configured to select a transfer function 177 based on the environmental data 196. The selected transfer function 177 may enable the controller 110 to account for the portion of the characteristics of the weight bearing structures 120, 130, 140 that may be attributed to the environmental conditions (e.g., a portion of the frequencies of resonance attributable to wind) when determining the weight of at least a portion of the structure supported by the weight bearing structures 120, 130, 140. For example, the controller 110 may apply the selected transfer function 177 to the sensor data 126, 136, 146 to remove the portions of the characteristics of the weight bearing structures 120, 130, 140 that may be attributed to the environmental conditions prior to determining the weight of at least a portion of the structure supported by each of the weight bearing structures 120, 130, 140. In an embodiment, the instructions 175 may include instructions that, when executed by the processor 160, cause the processor 160 to determine a weight of at least a portion of a structure supported by the weight bearing structures 120, 130, 140 based at least in part on a wind speed and/or a wind direction indicated by the environmental data 196. In an embodiment, the instructions 175 may include instructions that, when executed by the processor 160, cause the processor 160 to determine a transfer function 177 based at least in part on a wind speed and/or a wind direction indicated by the environmental data 196.

As another example, when determining the weight of at least a portion of the structure, the weight determination system 100 may be configured to determine that a response of a weight bearing structure (e.g., the weight bearing structure 120) to a force applied by an actuator (e.g., the actuator 122) has been affected by a particular environmental condition (e.g., a temperature). For example, despite the weight of the portion of the structure being supported by the weight bearing structure 120 remaining constant, the response (e.g., the frequency of resonance, the amplitude of the resonance, etc.) of the weight bearing 120 may increase or decrease in response to changes in the temperature. The weight determination system 100 may be configured to account for changes in the response of the weight bearing structures 120, 130, 140 caused by changes in the temperature of the weight bearing structure and/or of the environment surrounding the weight bearing structure. In an embodiment, the instructions 175 may include instructions that, when executed by the processor 160, cause the processor 160 to determine a weight of at least a portion of a structure supported by the weight bearing structures 120, 130, 140 based at least in part on a temperature indicated by the environmental data 196. In an embodiment, the instructions 175 may include instructions that, when executed by the processor 160, cause the processor 160 to determine a transfer function 177 based at least in part on a temperature indicated by the environmental data 196.

As yet another example, a humidity level may dampen (e.g., reduce) the response (e.g., the frequency of resonance, the amplitude of the resonance, etc.) of the weight bearing structures 120, 130, 140. Thus, despite the weight of the portions of the structure being supported by the structures 120, 130, 140 remaining constant, the response (e.g., the frequency of resonance, the amplitude of the resonance, etc.) of the weight bearing structures 120, 130, 140 may change in response to changes in the humidity level. The weight determination system 100 may be configured to account for changes in the response of the weight bearing structures 120, 130, 140 caused by changes in the humidity level of an environment surrounding the weight bearing structures 120, 130, 140. In an embodiment, the instructions 175 may include instructions that, when executed by the processor 160, cause the processor 160 to determine a weight of at least a portion of a structure supported by the weight bearing structures 120, 130, 140 based at least in part on a humidity level indicated by the environmental data 196. In an embodiment, the instructions 175 may include instructions that, when executed by the processor 160, cause the processor 160 to determine a transfer function 177 based at least in part on a humidity level indicated by the environmental data 196.

In an embodiment, the weight determination system 100 may include multiple environmental sensors 194. Each of the weight bearing structures 120, 130, 140 may be coupled to at least one of the multiple environmental sensors 194. In this embodiment, the environmental data 196 generated by one of the multiple environmental sensors 194 may be descriptive of an environmental condition local to a particular one of the weight bearing structures 120, 130, 140. By coupling the multiple environmental sensors 194 to the weight bearing structures 120, 130, 140, environmental data 196 generated by a particular one of the multiple environmental sensors 194 may more accurately reflect environmental conditions at a particular one of the weight bearing structures 120, 130, 140, increasing the accuracy of the weight determinations of the weight determination system 100.

In an embodiment, the memory 170 may include a database that includes the actuator information 171, the sensor information 172, the weight information 173, the timestamp information 174, the attitude information 176, the environmental information 178, or a combination thereof. The actuator information 171 may include information included in the actuator commands 112, 114, 116. The actuator information 171 may include information associated with a type of each of the actuators 122, 132, 142. Additionally, the actuator information 171 may include information that indicates an amount of force applied to the weight bearing structures 120, 130, 140 and that indicates a duration of time that the force was applied to the weight bearing structures 120, 130, 140. The sensor information 172 may include information associated with a type of each of the sensors 124, 134, 144 and characteristic information associated with each of the weight bearing structures 120, 130, 140, such as the information included in the sensor data 126, 136, 146. The weight information 173 may include information associated with one or more determined weights of the structure. The attitude information 176 may include attitude information associated with weight determinations, such as whether the structure was situated on a level surface when a particular weight determination occurred. The attitude information may be determined based on the attitude data 182. The environmental information 178 may include information associated with environmental conditions, such as the information included in the environmental data 196.

The timestamp information 174 may include information that links information included in the actuator information 171, the sensor information 172, the attitude information 176, and the environmental information 178 to a particular weight determination included in the weight information 173. For example, the timestamp information 174 may indicate that a first weight determination was generated based on first sensor information generated by the sensors 124, 134, 144. The first sensor information may correspond to characteristics of the weight bearing structures 120, 130, 140 detected by the sensors 124, 134, 144 when the actuators 122, 132, 142 applied a first amount of force to the weight bearing structures. The characteristics of the weight bearing structures 120, 130, 140 may have been detected by the sensors 124, 134, 144 while the structure was situated on a level surface under first environmental conditions. The actuator information 171, the sensor information 172, the weight information 173, the timestamp information 174, the attitude information 176, and the environmental information 178 may form a database that may be used to monitor, test, and modify the weight determination system 100. For example, the data included in the database may be used to determine additional transfer functions 177, modify the existing transfer functions 177, or calibrate the weight determination system 100.

Thus, the weight determination system 100 may enable automated weight determinations of a structure, such as an aircraft. Additionally, the weight determination system 100 may increase the reliability and the accuracy of the weight determinations as compared to other onboard weight and balance systems (OBWBS). Further, the weight determination system 100 may be certified by the Federal Aviation Administration as an OBWBS for use with commercial aircraft.

Figure 3:
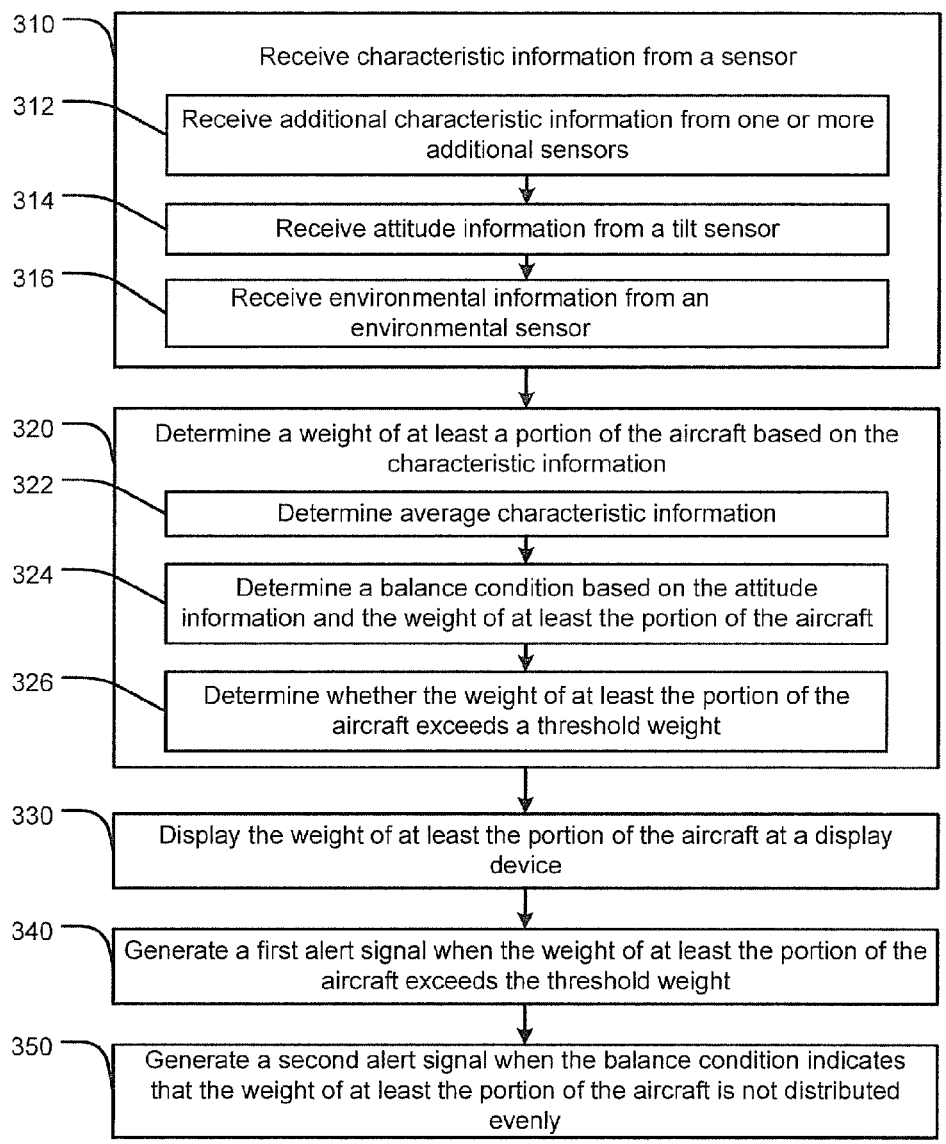
FIG. 3 is a flowchart of an embodiment of a method of determining a weight of a aircraft using a weight determination system.

Referring to FIG. 3, a flowchart of an embodiment of a method of determining a weight of an aircraft using a weight determination system is shown and designated 300. At 310, the method 300 includes receiving characteristic information from a sensor. In an embodiment, the characteristic information may be the sensor data 126 of FIG. 1 and may be received from the sensor 124 of FIG. 1. The characteristic information may be representative of a characteristic of a weight bearing structure (e.g., the weight bearing structure 120 of FIG. 1) of an aircraft when a force (e.g., the force 202 of FIG. 2) is applied to the weight bearing structure. In an embodiment, the characteristic of the weight bearing structure may be associated with, or correspond to response (e.g., the response 204 of FIG. 2) of the weight bearing structure when the force is applied to the weight bearing structure. In an embodiment, the method 300 includes, at 312, receiving additional characteristic information from one or more additional sensors. The additional characteristic information (e.g., the sensor data 136, 146) may be representative of a characteristic of one or more additional weight bearing structures (e.g., the weight bearing structures 130, 140) of the aircraft when a force is applied to the one or more additional weight bearing structures. In an embodiment, the method 300 includes, at 314, receiving attitude information from a tilt sensor. The attitude information (e.g., the attitude data 182 of FIG. 1) may indicate whether the aircraft is situated on a level surface. In an embodiment, the method 300 includes, at 316, receiving environmental information from an environmental sensor coupled to the weight bearing structure. The environmental information (e.g., the environmental data 196) may be descriptive of an environmental condition such as a humidity level, a temperature, a wind speed, a wind direction, or a combination of these environmental conditions.

At 320, the method 300 includes determining a weight of at least a portion the aircraft based on the characteristic information. In an embodiment, the method 300 includes, at 322, determining average characteristic information. The average characteristic information may, for each weight bearing structure, be determined based on particular characteristic information associated with a particular weight bearing structure over a period of time. In an embodiment, the weight of at least the portion of the aircraft may be determined based on the average characteristic information. In an embodiment, the method 300 includes, at 324, determining a balance condition based on the attitude information and the weight of at least the portion of the aircraft. The balance condition may indicate whether the weight of at least the portion of the aircraft is distributed evenly. In an embodiment, the method 300 includes, at 326, determining whether the weight of at least the portion of the aircraft exceeds a threshold weight.

At 330, the method 300 includes displaying the weight of at least the portion of the aircraft at a display device. At 340, the method 300 includes generating a first alert signal when the weight of the at least the portion of the aircraft exceeds the threshold weight. The alert signal (e.g., the alert command 192) may be transmitted to one or more alert devices, such as the alert device(s) 190 of FIG. 1. At 350, the method 300 includes generating a second alert when the balance condition indicates that the weight of the aircraft is not distributed evenly.

Figure 4:
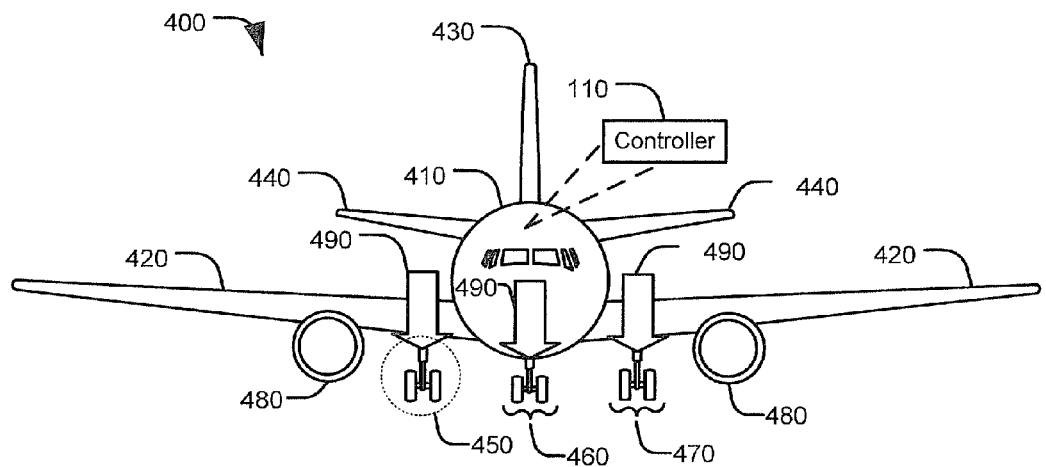
FIG. 4 is an illustrative embodiment of an aircraft that includes a weight determination system configured to determine a weight of the aircraft.

Referring to FIG. 4, an illustrative embodiment of an aircraft that includes a weight determination system configured to determine a weight of the aircraft is shown and designated 400. As shown in FIG. 4, the aircraft 400 includes a fuselage 410, wings 420, a vertical stabilizer 430, horizontal stabilizers 440, wing-mounted landing gear components 450, 470, a fuselage-mounted landing gear component 460, engines 480, and the controller 110 of FIG. 1. When the landing gear system has been deployed and the aircraft 400 is resting on the landing gear components 450, 460, 470, and a weight 490 of the aircraft 400 may be distributed to the landing gear components 450, 460, 470. The controller 110 may be configured to determine a weight of the aircraft 400 using a weight determination system, such as the weight determination system 100 of FIG. 1.

Figure 5:
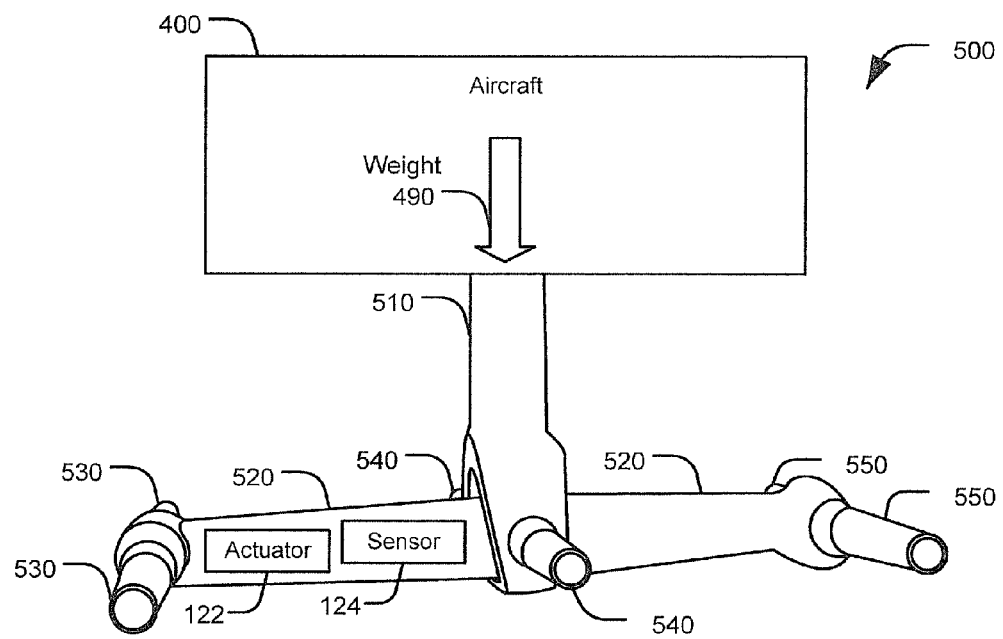
FIG. 5 is an illustrative embodiment of a weight determination system that is integrated with one or more components of the aircraft of FIG. 4.

For example, the controller 110 may be communicatively coupled to actuators (e.g., the actuators 122, 132, 142 of FIG. 1) and to sensors (e.g., the sensors 124, 134, 144). The actuators and the sensors may be coupled to components of the landing gear system, such as the wing-mounted landing gear components 450, 470 and the fuselage-mounted landing gear component 460. To illustrate, referring to FIG. 5, an illustrative embodiment of a portion of a weight determination system (e.g., the weight determination system 100 of FIG. 1) that is integrated with one or more components of the aircraft 400 of FIG. 4 is shown and designated 500. In FIG. 5, the wing-mounted landing gear component 450 is shown coupled to the aircraft 400 and supporting at least a portion of the weight 490 of the aircraft 400. As shown in FIG. 5, the wing-mounted landing gear component 450 includes a strut 510, a truck 520, a first axle 530, a second axle 540, and a third axle 550. Each of the axles 530, 540, 550 may be coupled to one or more wheel assemblies (e.g., a rim and tire) and a braking system (not shown in FIG. 5).

In an embodiment, the wing-mounted landing gear component 450 may include or correspond to the weight bearing structure 120 of FIG. 1 and may be coupled to the actuator 122 of FIG. 1 and to the sensor 124 of FIG. 1. As shown in FIG. 5, the actuator 122 and the sensor 124 are coupled to the truck 520. The actuator 122 and the sensor 124 may be communicatively coupled to the controller 110 and may transmit and/or receive data from the controller 110 as described with reference to FIGS. 1-3. For example, the actuator 122 may receive the actuator command 112 from the controller 110 and, in response to receiving the actuator command 112, apply a force (e.g., the force 202 of FIG. 2) to the truck 520. The sensor 124 may detect a characteristic (e.g., the response 204 of FIG. 2) of the truck 520 during the application of the force to the truck 520 by the actuator 122 and may generate and transmit the sensor data (e.g., the sensor data 126) to the controller 110. The sensor data may indicate a characteristic (e.g., a frequency of resonance) of the truck 520. The controller 110 may determine a portion of the weight 490 of the aircraft 400 that is supported by the wing-mounted landing gear component 450 based on the sensor data received from the sensor 124.

In an embodiment, more than one actuator and more than one sensor may be coupled to the truck 520. For example, a first actuator and a first sensor may be coupled to the truck 520 between the first axle 530 and the second axle 540, and an additional actuator and an additional sensor may be coupled to the truck 520 between the second axle 540 and the third axle 550. In another embodiment, a single actuator and multiple sensors may be coupled to a weight bearing structure (e.g., the strut 510, the truck 520, or one or more of the axles 530, 540, 550). For example, the actuator 122 may be coupled to the truck 520 and an array of sensors may be coupled to multiple locations of the truck 520. In an embodiment, the array of sensors may include multiple sensors (e.g., multiple sensors 124 of FIG. 1) configured to detect a characteristic of the truck 520. The array of sensors may also include at least one environmental sensor (e.g., the environmental sensor 194 of FIG. 1). In another embodiment, the actuator 122 and the sensor 124 may be coupled to the strut 510 or to one or more of the axles 530, 540, 550. In another embodiment, an actuator and a sensor may be coupled to each of the axles 530, 540, 550. For example, a first actuator and a first sensor may be coupled to the first axle 530, a second actuator and a second sensor may be coupled to the second axle 540, and a third actuator and a third sensor may be coupled to the third axle 550. In an embodiment, actuators and sensors may be coupled to multiple components of the wing-mounted landing gear component 450. For example, one or more actuators and sensors may be coupled to the truck 520 and one or more additional actuators and sensors may be coupled to the strut 510 and/or one or more of the axles 530, 540, 550. Although the weight bearing structures shown in FIG. 5 include the strut 510, the truck 520, and the axles 530, 540, 550, other weight bearing structures (not shown) may be used with a weight determination system, such as an assembly that couples the strut 510 to the aircraft 400.

Figure 6:
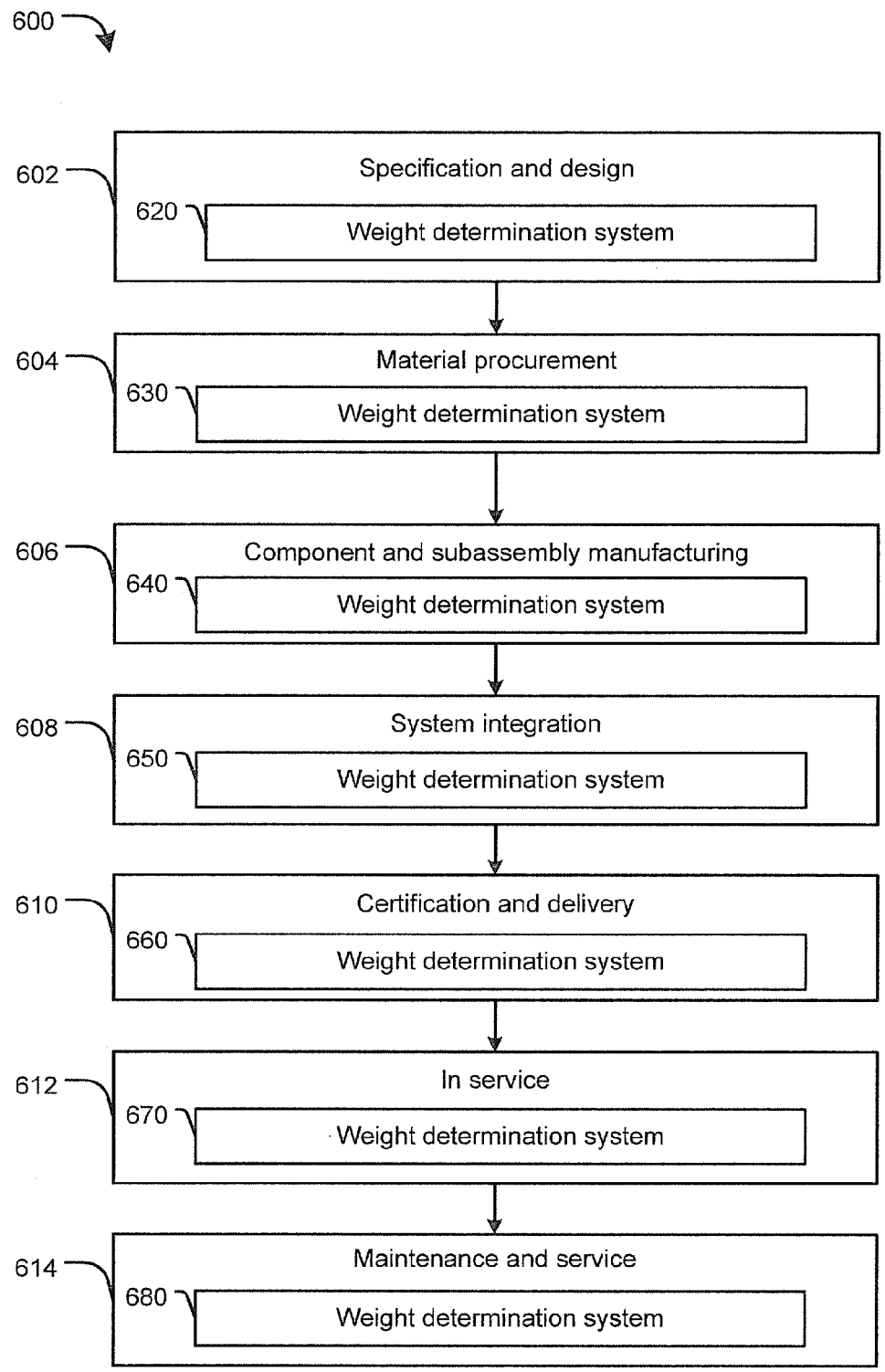
FIG. 6 is a flowchart illustrative of a life cycle of an aircraft that includes a weight determination system.

Referring to FIG. 6, a flowchart illustrative of a life cycle of an aircraft that includes a weight determination system is shown and designated 600. During pre-production, the exemplary method 600 includes, at 602, specification and design of an aircraft, such as the aircraft 702 described with reference to FIG. 7 or the aircraft 400 described with reference to FIGS. 4 and 5. During specification and design of the aircraft, the method 600 may include, at 620, specification and design of a weight determination system, such as the weight determination system 100 of FIG. 1. At 604, the method 600 includes material procurement. At 630, the method 600 includes procuring materials (e.g., actuators, sensors, etc.) for the weight determination system.

During production, the method 600 includes, at 606, component and subassembly manufacturing and, at 608, system integration of the aircraft. The method 600 may include, at 640, component and subassembly manufacturing (e.g., coupling the actuators and the sensors to the weight bearing structures) of the weight determination system and, at 650, system integration (e.g., coupling the actuators and the sensors to the controller) of the weight determination system. At 610, the method 600 includes certification and delivery of the aircraft and, at 612, placing the aircraft in service. Certification and delivery may include, at 660, certifying the weight determination system as a primary aircraft weight system (e.g., a primary OBWBS). At 670, the method 600 includes placing the weight determination system in service. While in service by a customer, the aircraft 702 may be scheduled for routine maintenance and service (which may also include modification, reconfiguration, refurbishment, and so on). At 614, the method 600 includes performing maintenance and service on the aircraft. At 680, the method 600 includes performing maintenance and service of the weight determination system. For example, maintenance and service of the weight determination system may include calibrating the weight determination system, replacing one or more of the actuators, sensors, the controller, etc.

Each of the processes of method 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Figure 7:
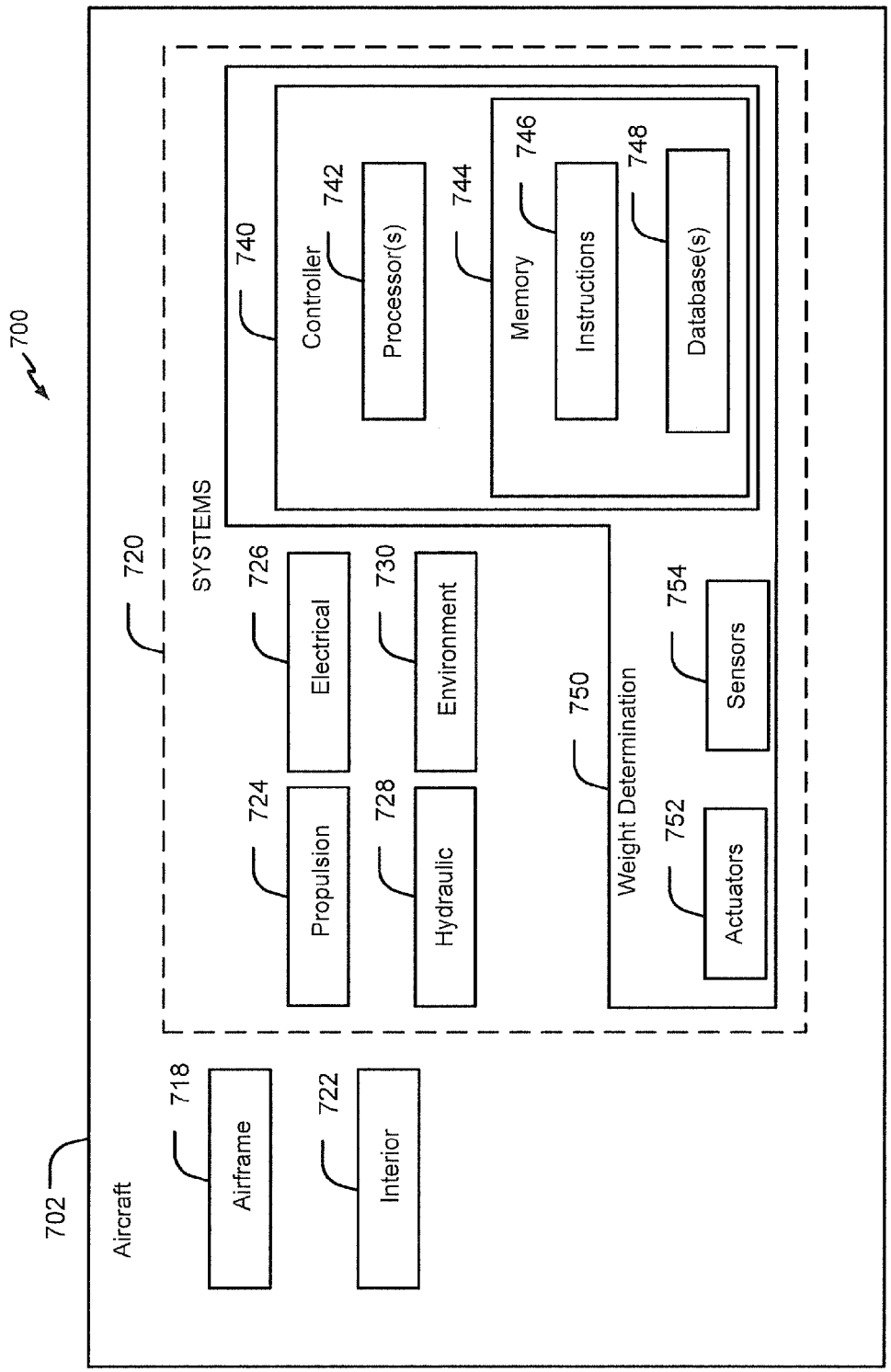
FIG. 7 is a block diagram of an illustrative embodiment of an aircraft that includes a weight determination system.

Referring to FIG. 7, a block diagram of an illustrative embodiment of an aircraft that includes a weight determination system is shown and designated 700. As shown in FIG. 7, the aircraft 702 produced by the method 600 may include an airframe 718 with a plurality of systems 720 and an interior 722. Examples of high-level systems 720 include one or more of a propulsion system 724, an electrical system 726, a hydraulic system 728, an environmental system 730, and a weight determination system 750. The weight determination system 750 may be the weight determination system 100 described with reference to FIG. 1 and may include a controller 740, actuators 752 (e.g., the actuators 122, 132, 142 of FIG. 1), and sensors 754 (e.g., the sensors 124, 134, 144 of FIG. 1). The controller 740 may include a processor 742 and a memory 744. In an embodiment, the controller 740 may be the controller 110 of FIG. 1, the processor 742 may be the processor 160 of FIG. 1, and the memory 744 may be the memory 170 of FIG. 1. The memory 744 may include instructions 746 and a database(s) 748. In an embodiment, the instructions 746 may be the instructions 175 of FIG. 1. In an embodiment, the database(s) 748 may include the actuator information 171, the sensor information 172, the weight information 173, the timestamp information 174, the attitude information 176, the transfer functions 177, the environmental information 178 or a combination thereof. The weight determination system 750 may be used to determine a weight of the aircraft 702 as described with reference to FIGS. 1-3. Any number of other systems may be included. Although an aerospace example is shown, the embodiments described herein may be applied to other industries, such as the automotive industry. Additionally, although the embodiments described herein illustrate using the weight determination system to determine the weight of at least a portion of a structure, such as an aircraft, a weight determination system according to one or more of the embodiments described herein may be used to determine a weight of at least a portion of another structure, such as a bridge, a building, a ship, a train, a machine, etc.

Apparatus and methods embodied herein may be employed during any one or more of the stages of the production and service method 600. For example, components or subassemblies corresponding to production process 608 may be fabricated or manufactured in a manner similar to components or subassemblies produced while the aircraft 702 is in service, at 612 for example and without limitation. Also, one or more apparatus embodiments, method embodiments, or a combination thereof may be utilized during the production stages (e.g., elements 602-610 of the method 600), for example, by substantially expediting assembly of or reducing the cost of the aircraft 702. Similarly, one or more of apparatus embodiments, method embodiments, or a combination thereof may be utilized while the aircraft 702 is in service, at 612 for example and without limitation, to maintenance and service, at 614.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the illustrations or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments and other embodiments not specifically described herein will be apparent to those of skill in the art upon reviewing the description.

In the foregoing Detailed Description, various features may have been grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. An aircraft comprising:
a weight bearing component of landing gear of the aircraft;
an actuator coupled to the weight bearing component of landing gear of the aircraft and configured to apply a force to the weight bearing component of landing gear of the aircraft;
a sensor coupled to the weight bearing component of landing gear of the aircraft and configured to generate sensor data associated with the force applied to the weight bearing component of landing gear of the aircraft by the actuator, wherein the sensor data includes a frequency of resonance of the weight bearing component of landing gear of the aircraft when the force is applied to the weight bearing component of landing gear of the aircraft;
a processor communicatively coupled to the sensor; and
a memory storing instructions that, when executed by the processor, cause the processor to determine a weight of at least a portion of the aircraft based on the sensor data.

2. The aircraft of claim 1, further comprising an environmental sensor, wherein the environmental sensor is configured to generate environmental data descriptive of an environmental condition, wherein the environmental condition includes a wind speed, wherein the processor is communicatively coupled to the environmental sensor, and wherein the memory further comprises instructions that, when executed by the processor, cause the processor to determine the weight of at least the portion of the aircraft based at least in part on the environmental data received from the environmental sensor.

3. The aircraft claim 2, wherein the environmental condition includes a wind direction.

4. The aircraft of claim 1, further comprising an environmental sensor, wherein the environmental sensor is coupled to the weight bearing component and is configured to generate environmental data descriptive of an environmental condition, and wherein the environmental condition includes a humidity level.

5. The aircraft of claim 1, wherein the actuator applies the force to the weight bearing component of landing gear of the aircraft in response to an actuator command received from the processor.

6. The aircraft of claim 1, wherein the actuator applies the force for a period of time, wherein the sensor is configured to detect a characteristic of the weight bearing component of landing gear of the aircraft during the period of time, and wherein the sensor data is generated based on the characteristic.

7. The aircraft of claim 6, wherein the characteristic is associated with the frequency of resonance of the weight bearing component of landing gear of the aircraft.

8. The aircraft of claim 1, further comprising a database stored at the memory, the database including information associated with an amount of the force applied to the weight bearing component of landing gear of the aircraft, a duration of time that the force was applied to the weight bearing component of landing gear of the aircraft, the sensor data, and the weight of the aircraft.

9. The aircraft of claim 1, wherein the weight bearing component is a truck, an axle, a strut, or a combination thereof.

10. The aircraft of claim 1, further comprising:
one or more additional weight bearing components;
one or more additional actuators, wherein each of the one or more additional actuators is coupled to a particular weight bearing component of the one or more additional weight bearing components and is configured to apply a particular force to the particular weight bearing component; and
one or more additional sensors, wherein each of the one or more additional sensors is coupled to the particular weight bearing component of the one or more additional weight bearing components and is configured to generate additional sensor data associated with the particular force applied to the particular weight bearing component by a respective actuator,
wherein the processor is communicatively coupled to the one or more additional sensors, and wherein the instructions further comprise instructions that, when executed by the processor, cause the processor to determine a weight of at least one additional portion of the aircraft based on the additional sensor data.

11. A method comprising:
transmitting an actuator command to an actuator;
receiving sensor data from a sensor coupled to a weight bearing component of landing gear of an aircraft, the sensor data generated responsive to a force applied to the weight bearing component by the actuator in response to the actuator command, wherein the sensor data includes a frequency of resonance of the weight bearing component of landing gear of the aircraft, the frequency of resonance attributable to the force applied to the weight bearing component of landing gear of the aircraft; and
determining a weight of at least a portion the aircraft based on the sensor data.

12. The method of claim 11, further comprising:
receiving attitude information from an attitude sensor, wherein the attitude information indicates whether the aircraft is situated on a level surface;
determining a balance condition based on the attitude information and the weight of at least the portion of the aircraft, wherein the balance condition indicates whether weight of the aircraft is distributed evenly; and
generating an alert when the balance condition indicates that the weight of the aircraft is not distributed evenly.

13. The method of claim 11, further comprising:
receiving additional sensor data from one or more additional sensors, wherein the additional sensor data is associated with a second force applied to a second weight bearing component by a second actuator, wherein the additional sensor data includes a second frequency of resonance of the second weight bearing component when the second force is applied to the second weight bearing component;

determining average sensor data, wherein for each weight bearing component, the average sensor data is determined based on particular sensor data associated with a particular weight bearing component over a period of time; and determining the weight of the aircraft based on the average sensor data.

14. The method of claim 11, wherein the weight bearing component is a truck, an axle, a strut, or a combination thereof.

15. A non-transitory computer-readable storage device comprising instructions that, when executed by a processor, cause the processor to:

transmit an actuator command to an actuator;

receive sensor data from a sensor coupled to a weight bearing component of landing gear of an aircraft, the sensor data generated responsive to a force applied to the weight bearing component by the actuator in response to the actuator command, wherein the sensor data includes a frequency of resonance of the weight bearing component of landing gear of the aircraft, the frequency of resonance attributable to the force applied to the weight bearing component of landing gear of the aircraft; and determine a weight of at least a portion of the aircraft based on the sensor data.

16. The non-transitory computer-readable storage device of claim 15, wherein the weight bearing component is coupled to the actuator.

17. The non-transitory computer-readable storage device of claim 15, further comprising instructions that, when executed by the processor, cause the processor to:

determine whether the weight of at least the portion of the aircraft exceeds a threshold weight; and generate an alert signal when the weight of at least the portion of the aircraft exceeds the threshold weight.

18. The non-transitory computer-readable storage device of claim 15, further comprising instructions that, when executed by the processor, cause the processor to initiate display of the weight of at least the portion of the aircraft at a display device coupled to the processor.

19. The non-transitory computer-readable storage device of claim 15, further comprising instructions that, when executed by the processor, cause the processor to store in a memory a database entry, wherein the database entry includes the weight, a timestamp, a magnitude of the force, a duration of the force, data indicating whether the aircraft was on a level surface while receiving information from the sensor, and environmental data.

* * * * *